Oct. 2, 1928.

H. PARKER

COUPLING FOR FIBER PIPES

Original Filed Oct. 16, 1922    2 Sheets-Sheet 1

1,686,498

Inventor
Howard Parker
By T. Clay Lindsey
His Attorney

Patented Oct. 2, 1928.

1,686,498

UNITED STATES PATENT OFFICE.

HOWARD PARKER, OF BERLIN, NEW HAMPSHIRE, ASSIGNOR TO BROWN COMPANY, OF BERLIN, NEW HAMPSHIRE, A CORPORATION OF MAINE.

COUPLING FOR FIBER PIPES.

Application filed October 16, 1922, Serial No. 594,797. Renewed September 30, 1925.

The object of the present invention is to provide a novel and advantageous coupling for joining a tube or pipe formed of fibrous or pulp stock to another pipe or other member formed of the same or of different material. More particularly, the aim of the invention is to provide a coupling for fiber pipe which is simple and economical in construction, which may be readily applied, and which is very efficient in that it forms a secure and fluid tight joint, and prevents the permeation of moisture between the pipe and the sleeve forming a part of the coupling. The parts of my improved coupling may be assembled on the pipe at the factory where proper care may be taken by skilled persons, and then shipped to the field where ordinary workmen may lay the same. Thus the ends of the pipes are protected during shipment and the duties of the unskilled workmen employed in laying the pipe are minimized, a feature which is of the utmost importance in the art of pulp or fiber tubes, where injury is liable to result to the product through ignorance or lack of precaution.

In the accompanying drawings wherein I have shown, for illustrative purposes, two embodiments which the present invention may take, Fig. 1 is a side elevational view of my improved coupling;

Figure 1:
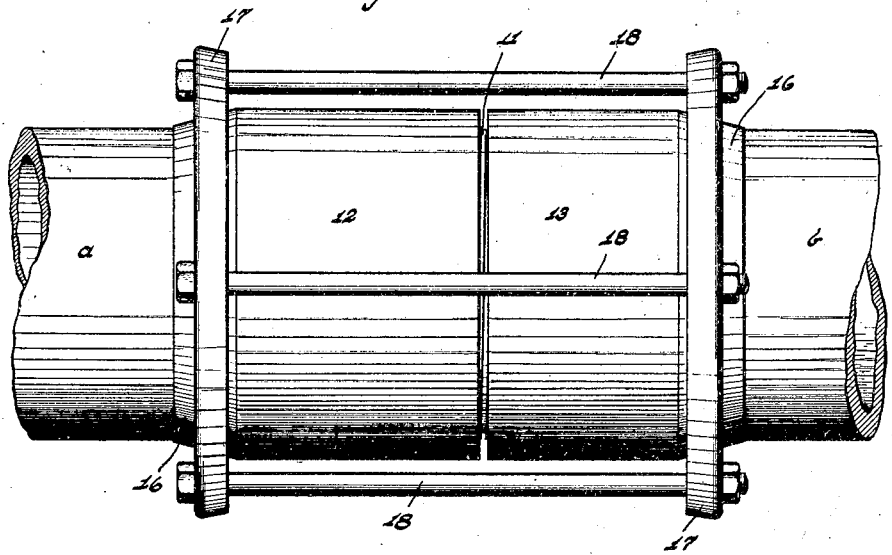
Figure 2:
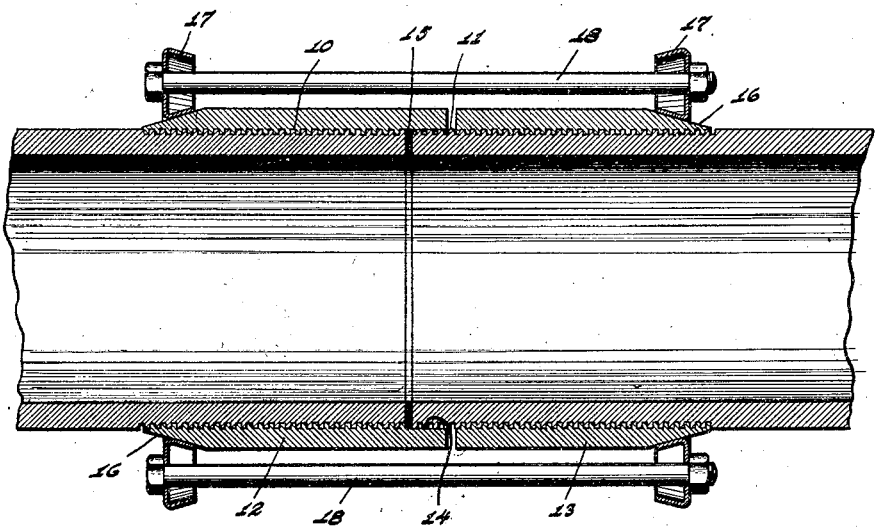
Fig. 2 is a view in central longitudinal section.

Referring to Figs. 1 and 2 of the drawings in deail, $a$, $b$, denote the pipes to be connected together, these pipes preferably being formed of fiber as by winding, under pressure, a wet web of pulp onto a mandrel until the desired thickness of tube is formed, then thoroughly drying the pipe or tube and then waterproofing it. One of these pipes may be of fiber and the other of metal, for instance. In accordance with the present invention, the adjacent ends of the pipes are externally threaded as at 10 and 11, respectively. Screwed onto these respective threaded ends are the sleeves 12 and 13, also preferably constructed of fiber or paper stock. Each of said sleeves is an integral cylindrical member which is circumferentially continuous throughout its length; that is to say, each sleeve is devoid of any slits, slots or cracks, as will be seen from the drawings. One of these sleeves, in the present instance sleeve 12, extends beyond the end of the pipe 10 with which it is associated and the internal periphery of this protruding portion is smooth as at 14 and of such diameter that the threaded end of the other pipe 11 has a close but sliding fit therein. The other sleeve 13 terminates short of the end of the pipe 11 on which it is screwed a distance slightly greater than the extent to which the sleeve 12 protrudes beyond the pipe 10 so as to permit the ends of the pipes to be abutted and drawn tightly together without bringing the ends of the sleeves into engagement. If desired, a gasket 15 may be interposed between the pipes. The outer or extreme end of each sleeve is beveled or tapered, as at 16, and fitting about these tapered ends are collars 17, each preferably formed of sheet metal pressed into shape and having its internal flange tapered correspondingly to the bevel of the sleeves. These collars are connected together by bolts 18, spaced symmetrically about the axis of the pipes.

It will be seen with the arrangement described that men at the factory who have been specially trained for this work may prepare the pipes and the sleeves, properly assemble the respective sleeves on the pipes and apply protective coatings on the threads where required, thus assuring that all details are properly taken care of. The pipes with the assembled sleeves and collars thereon may then be shipped to the field where the only work that the men who actually lay the line have to do is to bring the ends of the pipes together with a gasket interposed therebetween, insert the bolts through the collars and then tighten up the bolts to draw together the abutting ends of the pipes with the assurance that a tight, secure joint is produced without any great degree of care or skill being used on the part of the workmen. Since the sleeves have already been secured to the thread ends of the pipes, these threaded ends cannot be damaged during shipment or by unskilled workmen who are liable, through carelessness or ignorance, to roughly handle the product.

It is understood that in order to permit screwing of the sleeves onto the pipes, a certain amount of looseness between the complementary threads must be provided for and, unless prevented, moisture will find its way in between the sleeves and the pipes. With the arrangement of the present invention, it will be noted that when the collars are drawn towards each other upon tightening up of the bolts, these collars ride up the conical or bevelled ends of the sleeves and contract the same whereby the threads on the sleeves are pressed into intimate contact with the threaded portions of the pipes thus producing a close joint or fit between the complementary threads which increases the resistance to and actually prevents the permeation of moisture along the joint. The sleeves being of fiber are sufficiently strong to withstand any ordinary strain to which they are subjected while at the same time they are sufficiently resilient or yielding to be compressed or contracted against the pipes by the collars.

Figure 3:
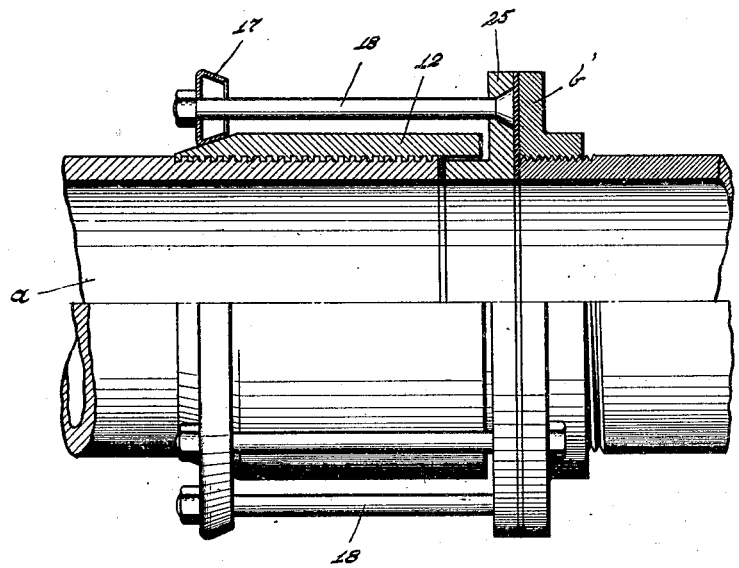
Fig. 3 is a view showing another embodiment of my invention wherein a fiber pipe is coupled to a flange member.

In the embodiment shown in Fig. 3, the fiber pipe $a$ is connected by the use of my improved coupling to a metal flange member $b'$. In this instance, the end of the fiber pipe $a$ engages a pipe-like portion 25 on the flange member and the sleeve 12 telescopes over the portion 25. It is, of course, evident that this arrangement is by way of illustration only,—for instance, the sleeve 12 may terminate short of the fiber pipe and the portion 25 may be of such diameter that the protruding end of the fiber pipe will telescope thereinto and come up against an internal shoulder. About the tapered end of the sleeve 12 is a collar or compression ring 17 connected to the flange member by bolts 18. When these bolts are tightened up, the fiber pipe and flange member will be drawn together, and the collar will ride up onto the sleeve compressing the same against the fiber pipe as in the preceding embodiment.

It is, of course, obvious that my invention is susceptible of various modifications and changes which are within the spirit of the invention without departing from the scope of the following claims, it being understood that the present disclosure of my invention is by way of illustration only and it is not to be taken as restrictive of my conception.

I claim as my invention:

1. A coupling for fiber pipe, and in combination, a fiber pipe having an externally threaded end, an integral internally threaded fiber sleeve screwed on said pipe and having a tapered end which is circumferentially continuous, a collar having its internal periphery tapered correspondingly to and arranged about the tapered end of said sleeve and adapted to compress the same against the pipe to form a tight joint therebetween, and bolts for drawing said collar longitudinally upon the tapered end of said sleeve whereby the latter is compressed.

2. A coupling for fiber pipe, and in combination, a fiber pipe having an externally threaded end, and integral internally threaded fiber sleeve screwed on said pipe and having its end spaced from the end thereof, said sleeve being circumferentially continuous, a second pipe member in telescopic relation to said sleeve, a collar about the outer end of said sleeve and adapted to compress the same into the threads of the pipe, and means between said collar and second pipe member for moving the collar longitudinally of said sleeve and drawing said fiber pipe and pipe member towards each other.

3. A coupling for fiber pipe, and in combination, a fiber pipe having an externally threaded end, an integral internally threaded sleeve screwed on said pipe and having a portion projecting beyond the end of said pipe, said projecting end having a smooth internal periphery, the other end of said sleeve being tapered, and circumferentially continuous and unbroken, a second pipe member closely and slidably received by said projecting end of said sleeve, a collar about the tapered end of said sleeve and arranged to compress the same into the threads of the pipe, and bolts between said collar and second pipe member for drawing said fiber pipe and second pipe member towards each other.

4. A coupling for fiber pipes, and in combination, a pair of fiber pipes having their adjacent ends externally threaded, an internally threaded sleeve screwed on each pipe and each having a tapered outer end, each of said sleeves being an integral member with its tapered outer end circumferentially continuous and unbroken, a collar arranged about the tapered end of each sleeve, and bolts for drawing said collars towards each other to thereby compress said sleeves against said pipes and to draw said pipes towards one another.

5. A coupling for fiber pipes, and in combination, a pair of fiber pipes having their adjacent ends externally threaded, an integral internally threaded sleeve screwed on said adjacent ends, one of said sleeves projecting beyond the end of the pipe on which it is screwed and said projecting end having a smooth internal periphery of such diameter as to closely but slidingly receive the adjacent end of the other pipe, and the sleeve on the other pipe terminating short of the end thereof a distance slightly greater than the extent to which the other sleeve projects beyond its pipe whereby said pipes may be brought into abutting relation, the extreme ends of said sleeves being tapered and being circumferentially continuous or unbroken, a collar surrounding the tapered end of each of said sleeves and arranged to compress the same into the threads of the respective pipes, and means for drawing said collars towards each other.

HOWARD PARKER.